D. L. MONRO.
TRUCK FOR HANDLING LOADED GOODS PLATFORMS AND METHOD OF WORKING THE SAME.
APPLICATION FILED SEPT. 2, 1921.
1,436,665.
Patented Nov. 28, 1922.
2 SHEETS—SHEET 1.
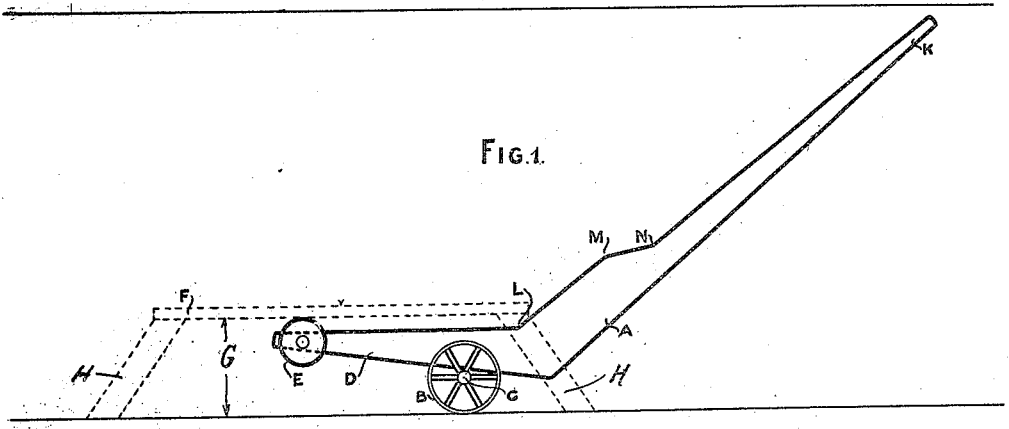
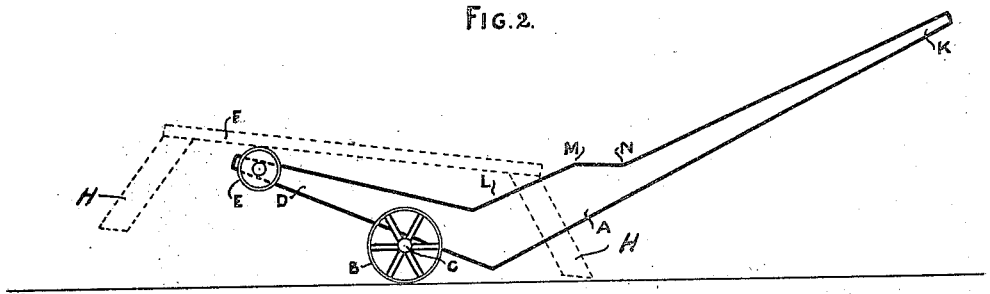
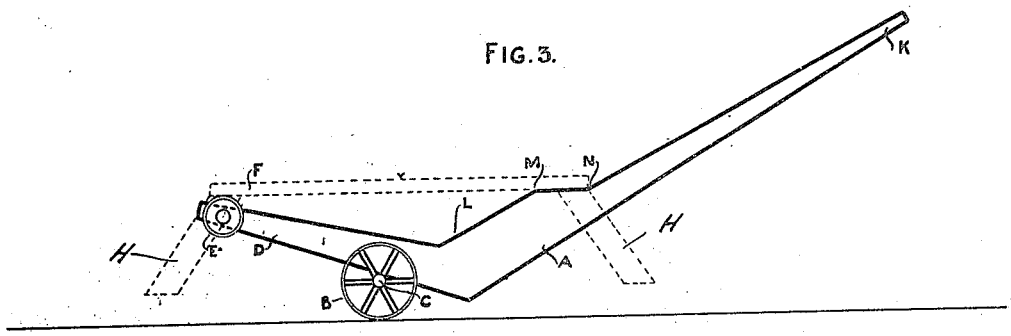

D. L. MONRO.
TRUCK FOR HANDLING LOADED GOODS PLATFORMS AND METHOD OF WORKING THE SAME.
APPLICATION FILED SEPT. 2, 1921.

1,436,665.

Patented Nov. 28, 1922.

Patented Nov. 28, 1922.

1,436,665

UNITED STATES PATENT OFFICE.

DAVID LUNAN MONRO, OF CALCUTTA, INDIA.

TRUCK FOR HANDLING LOADED-GOODS PLATFORMS AND METHOD OF WORKING THE SAME.

Application filed September 2, 1921. Serial No. 497,918.

*To all whom it may concern:*

Be it known that I, DAVID LUNAN MONRO, a subject of His Majesty King George V, and whose address is 2 Royal Exchange Place, Calcutta, British India, merchant, have invented an Improved Truck for Handling Loaded-Goods Platforms and Methods of Working the Same, of which the following is a specification.

The object of this invention is an improved platform truck and method of operating the same.

According to recent development in handling goods, luggage and the like low platforms are used on which the goods being unloaded from a train, ship or warehouse or being otherwise handled are placed. These platforms when suitably loaded are raised or placed upon trucks which can convey them about from place to place.

The great difficulty is economically to lift these platforms upon the trucks to enable them to be moved. The object of this invention is to provide a suitable type of truck whereby the loaded platforms may be handled and raised with the minimum of labour and with the maximum simplicity of action and construction and economy in time.

With this object in view the improved platform truck is made in such a manner that it itself may be used as a lever for raising and adjusting the loaded platform upon itself in such a way that the load is suitably balanced on the truck and may be wheeled away. The design is such, moreover, that the loaded platform may be deposited where required and the truck released by simple straight-forward manipulation.

It will of course be understood that where these platform trucks are to be used the platforms themselves will be of standard size and have a standard clearance from the ground so that the trucks may conveniently be used for handling the same.

The truck will be described with reference to the accompanying drawings in which like letters of reference denote like parts throughout and in which:—

Figure 1 is a side elevation of the truck showing it introduced below a load platform;

Figure 2 shows an intermediate stage in the operation of tilting the platform and inserting the truck;

Figure 3 shows the platform lifted and in position for conveying from place to place.

Figure 4:
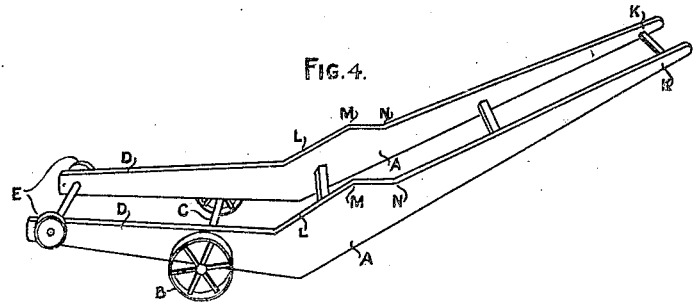
Figure 4 is a perspective view of a convenient form the truck may take.

In these figures the truck A is mounted on a pair of wheels B fixed to an axle C. This axle is suitably fixed below or passes through the framework of the truck, preferably being so arranged that the wheels B do not project substantially above the upper surface of such frame.

The cantilever end D of the truck carries a set of wheels, rollers or other anti-friction devices E at or near its end, these wheels or the like projecting above the upper surface of such cantilever. The load platform F is made of a standard size having a fixed clearance G from the ground, being supported on suitable legs or fixed trestles H, and may have two or more runners underneath along which the rollers E at the end of the cantilever arm may move freely.

The design of the truck is such that the cantilever end D may be run in under the platform and the end of such cantilever extend well beyond the centre of gravity of the platform when the surface L of the truck engages the edge of such platform as shown in Figure 1.

The method of operation is as follows:—

To raise the loaded platform F the truck is run under the same at either end, as far as it will go until the surface L of the truck engages the lower edge of such platform. When this has been done the roller or the like E will have reached a point beyond the centre of gravity of any fairly well balanced load. The handle K is then depressed when the far end of the platform will rise and the truck will be drawn in by the weight of the load until the rollers E have nearly reached the far end of the platform. While this action is taking place the upper surface of the truck from L to M slides forward underneath the near edge of the platform which finally takes up against the corner M.

The near end of the platform will then be immediately above the ledges MN which are intended to support it but be still resting on the floor. The handles are then allowed to rise, when the platform will rest at the far end on the rollers E and at the near end on the ledges MN.

Allowing the handles K to rise further, the platform is restored to level as shown in Figure 3, clearing the floor by about three inches or other suitable amount. Thus the simple application of a man's weight to the handles will engage the loaded (or unloaded) platform on the truck, and the release or lifting of the handles will clear the floor. The truck can then be pushed or pulled from place to place.

It will be seen that in lifting the load as indicated the truck is used as a lever having a fulcrum at C, the length of the handle C K being many times larger—say 3 or 4 times—than the cantilever arm from the fulcrum, the operator works at a considerable mechanical advantage, and a man can easily thereby hanlle loads of 500 or 600 lbs.

To release the platform from the truck, the handles are raised when the ledges MN will disengage, and the slope of the lever will push the truck backwards until the platform comes quietly to rest on the floor. The release may also be effected by reversing the action of engaging.

It will be seen from the above description that the truck in its simplest form has no moving parts which are liable to get out of order except the two running wheels B and the small roller wheels E. There are no cranks, connecting rods, catches or ratchets or the like. No wedges or levers are needed, the truck itself being the only lever.

It is advisable that the surface LM shall be of such an outline that friction between such surface and the edge of the platform shall be a minimum. To reduce the friction the upper surface of the truck between L and M, or between L and N, may have a strip of smooth metal attached thereto. The lower corners of the platforms may also be protected with a small angle iron or other suitable metal part so that the contact between the truck and the platform shall be metal to metal. Such contact when the parts in question have been polished by use is one which will offer very little frictional resistance to sliding. By such means it has been found that the loaded platform will slide into place upon a reasonable amount of force being applied, such amount depending upon the relative lengths of the cantilever part D and the handle K of the truck.

Figure 5:
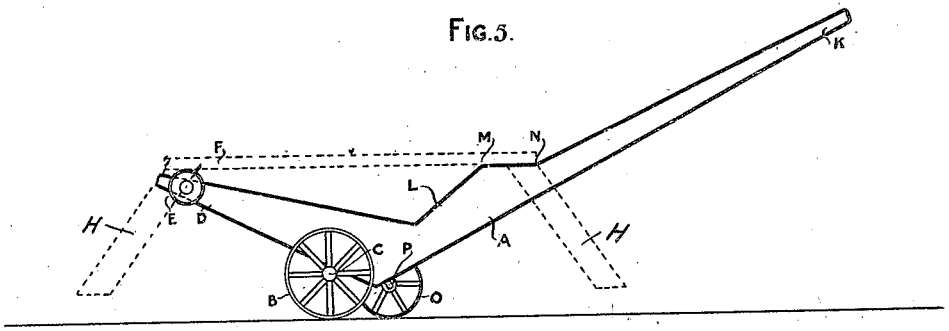
Figure 5 shows a modification of the truck in which another set of wheels is introduced better to balance the load in transit, if considered desirable.

A modification of the truck is shown in Figure 5 in which a subsidiary wheel or set of wheels O mounted on an axle or spindle P is added. Such extra set of wheels might be detachable and be only used when it was desired to move extra heavy loads, the balancing and movement of the load being thereby facilitated at the expense of part of the mechanical advantage when manipulating the load onto the truck.

It will of course be understood that I do not confine myself to the exact apparatus illustrated, but may use any reasonable modification of the same. For instance, the end of the cantilever lifting arm may be provided with any suitable antifriction rolling means, such as rollers or balls. The movement of the platform on the truck may be limited by any suitable means, such as by the provision of a stop against which the edge of the platform engages, or a notch, projection or suitable configuration of the upper surface of the truck.

The roller E at the end of the cantilever arm D may project below the under surface of the cantilever as well as above, the object of which is to facilitate the manœuvering of the truck when it is being run in under the platform.

It will be realized that for the most efficient working the platforms should be designed to fit the trucks and the invention will necessarily cover not only the truck but the truck combined with suitable platforms and also the method of working the same.

Having now particularly described and ascertained the nature of my said invention and the manner in which the same is to be performed, I declare that what I claim is:—

1. A hand truck for use in handling loaded platforms comprising a frame, a pair of carrying wheels mounted on such frame to one side of the centre of the same, the longer end of the frame constituting the handle of the truck and the shorter end a cantilever lifting part, characterized by the end of such lifting part being provided with a roller or other antifriction device projecting above the upper surface of the same.

2. A hand truck according to the preceding claim, characterized by the fact that the truck is designed to have its cantilever end pushed in under loaded platforms of suitable height and size, a suitable surface on the truck engaging the near lower edge of the platform at the same time as the antifriction roller or the like at the end of the cantilever lifting part engages the underside of the platform at a point beyond the centre of gravity of the load.

In testimony whereof I hereto affix my signature in presence of two witnesses, this third day of August, 1921.

DAVID LUNAN MONRO.

Witnesses:
AUSHOOTOSH MOOKERJIE,
INDER MOHAN BAUNJER.